United States Patent [19]
Mano et al.

[11] Patent Number: 5,963,627
[45] Date of Patent: Oct. 5, 1999

[54] COMMUNICATION TERMINAL HAVING FUNCTION FOR DISPLAYING ORIGINATOR IDENTIFICATION DATA

[75] Inventors: Hiroshi Mano; Takashi Watanabe; Terunori Suwa, all of Tokyo, Japan

[73] Assignee: Kabushiki Kaisha Toshiba, Kawasaki, Japan

[21] Appl. No.: 09/119,399

[22] Filed: Jul. 21, 1998

Related U.S. Application Data

[63] Continuation of application No. 08/834,870, Apr. 10, 1997, Pat. No. 5,799,074, which is a continuation of application No. 08/368,600, Jan. 4, 1995, abandoned.

[30] Foreign Application Priority Data

Jan. 7, 1994 [JP] Japan .................................. 6-000512

[51] Int. Cl.⁶ .............................. H04M 1/56; H04M 1/00; H04M 3/00
[52] U.S. Cl. .......................... 379/142; 379/157; 379/376; 379/194
[58] Field of Search ..................... 379/127, 142, 379/156, 157, 164, 165, 188, 189, 191, 198, 199, 196, 197, 140, 254, 373, 374, 375, 265, 264, 267, 270

[56] References Cited

U.S. PATENT DOCUMENTS

| | | | |
|---|---|---|---|
| 4,554,418 | 11/1985 | Toy . | |
| 4,933,526 | 6/1990 | Morganstein et al. | 379/164 |
| 5,388,150 | 2/1995 | Schneyer et al. | 379/142 |
| 5,446,785 | 8/1995 | Hirai | 379/142 |
| 5,465,292 | 11/1995 | Takahashi et al. | 379/164 |
| 5,479,493 | 12/1995 | Baker et al. | 379/127 |
| 5,754,635 | 5/1998 | Kim | 379/157 |
| 5,799,074 | 8/1998 | Mano et al. | 379/157 |

*Primary Examiner*—Paul Loomis
*Attorney, Agent, or Firm*—Finnegan, Henderson, Farabow, Garrett & Dunner, L.L.P.

[57] ABSTRACT

A communication terminal connected to an analog telephone network and has a function for transmitting an incoming call signal with originator identification data inserted. Notification of an incoming call is stopped during a time period from the detection of a first ringing signal of the incoming call signal to the detection of the originator identification data. A user is notified of the presence of the incoming call is notified after the originator identification data is detected and notified to the user.

17 Claims, 10 Drawing Sheets

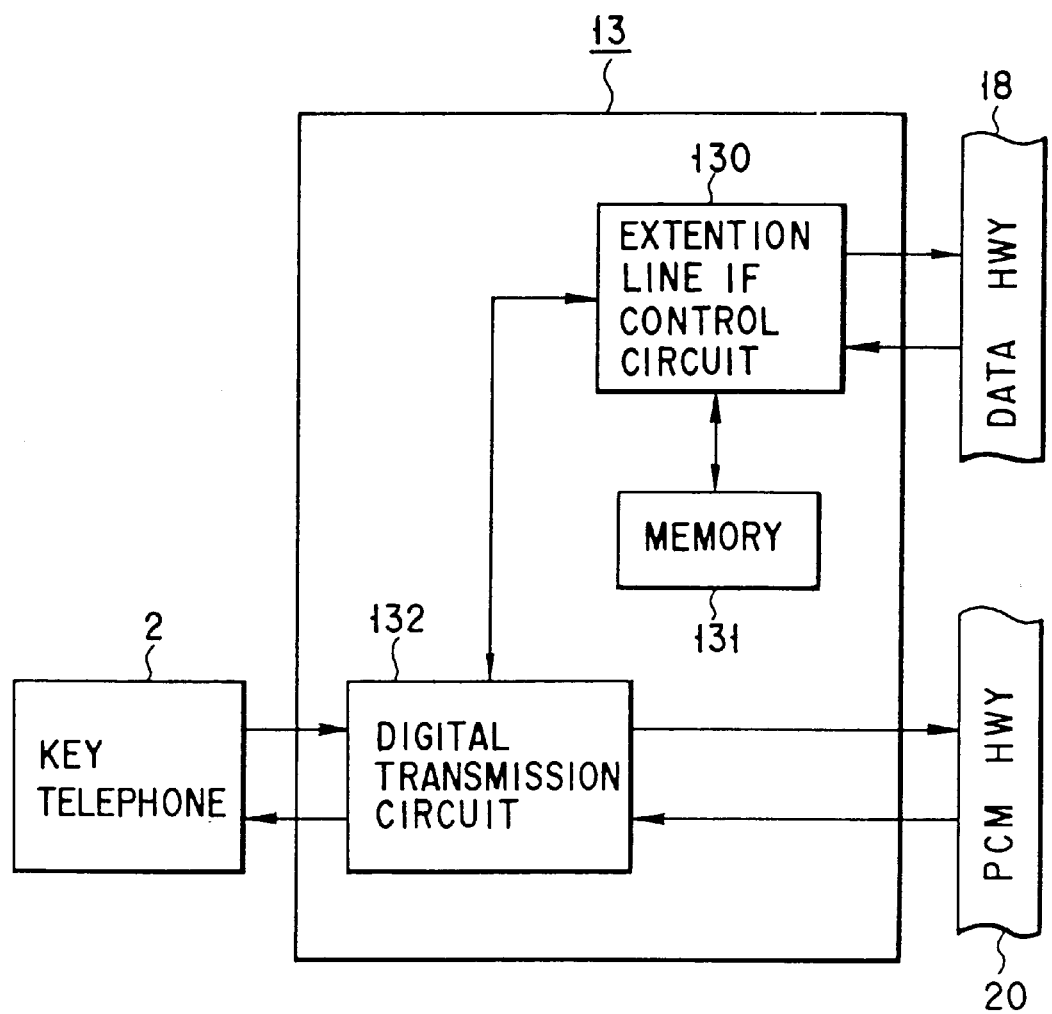
F I G. 4

COMMUNICATION TERMINAL HAVING FUNCTION FOR DISPLAYING ORIGINATOR IDENTIFICATION DATA

This is a continuation of application Ser. No. 08/834,870, filed Apr. 10, 1997, now U.S. Pat. No. 5,799,074 which is a continuation of application Ser. No. 08/368,600, filed Jan. 4, 1995, now abandoned, and claims the benefit of Japanese application no. 6-000512, filed Jan. 7, 1994, all of which are incorporated herein by reference.

BACKGROUND OF THE INVENTION

1. Field of the Invention

This invention relates to a communication terminal connected to a public network such as a telephone, a key telephone system, or a private branch exchange, and more particularly to a communication terminal having a function for receiving and displaying originator identification data to be transmitted from the public network to a destination.

2. Description of the Related Art

Analog telephone networks include a network having a function for notifying a destination subscriber of originator identification data, such as a telephone network for providing a service called "CLASS".

In an analog telephone network with such a function, originator identification data is notified to a destination in the following manner:

In the case of transmitting an incoming call signal by such an analog telephone network as has the "CLASS" service, a ringing signal of a predetermined frequency which continues two seconds is repeatedly transmitted at intervals of four seconds. Notification data for transmitting originator identification data is transmitted within an interval between the first and second ringing signals of the incoming call signal. A pose period of 0.5 seconds is inserted between the termination point of the first ringing signal and the start point of the notification data. The transmission period of the communication data is 575 ms. The format of the notification data is determined such that a synchronization signal of a "01"-repeated pattern, a mark signal, a message-type word, a data work count, a data section and a check sum are arranged in this order. The originator identification data contains "date/hour" and "originator number".

In the case of using a key telephone system as a communication terminal, the key telephone system detects, with the use of its key telephone control unit, notification data after detecting the first ringing signal. When the control unit has detected originator identification data from the notification data, it transmits the originator identification data to a destination key telephone, which in turn displays the data on its display unit. The user of the destination key telephone can recognize the originator of the call by seeing the originator identification data on the display.

The above-described conventional key telephone system, however, has the following drawback:

Suppose that the key telephone control unit has detected the first ringing signal transmitted from an analog network. Upon detecting the ringing signal, the key telephone control unit starts the transmission of a ringing signal to a destination key telephone, thereby causing the key telephone to ring so as to start notification of the incoming call. Subsequently, when the key telephone control unit has detected the originator identification data in the interval between the first and second ringing signals, it transmits the identification data to the destination key telephone, which in turn displays the data.

In other words, the key telephone rings before it displays the originator identification data.

Therefore, if the user performs a prompt off-hook operation immediately after he has heard the ringing, it is possible that he receives no originator identification data, since the transmission of the incoming call signal is ceased when a call response has been performed. A relatively large number of users perform a prompt off-hook operation in a conditioned reflex manner when they have heard a telephone ringing. Therefore, the above problem occurs in unexpectedly many cases.

SUMMARY OF THE INVENTION

It is a first object of the invention to provide a communication terminal capable of reliably notifying the user of originator identification data.

It is a second object of the invention to provide a communication terminal capable of reliably notifying the user of originator identification data and also capable of promptly notifying the user of an incoming call.

It is a third object of the invention to provide a communication terminal capable of preventing the user's off-hook operation during a time period from the detection of the first ringing signal to the detection of originator identification data.

It is a fourth object of the invention to provide a communication terminal capable of allowing the user to confirm originator identification data even after the user responds to a call.

It is a fifth object of the invention to provide a communication terminal capable of reliably detecting originator identification data and notifying the user of it even when the user has responded to an incoming call before the notification of originator identification data.

It is a sixth object of the invention to provide a key telephone system capable of reliably notifying the user of originator identification data.

It is a seventh object of the invention to provide a key telephone system capable of reliably detecting originator identification data and notifying the user of it even when the user has responded to an incoming call before the notification of originator identification data.

To attain the first object, there is provided a communication terminal connected via a subscriber line to a network having a function for transmitting a plurality of ringing signals to the communication terminal at regular intervals with an originator identification signal inserted in an interval between a k-th (k: a predetermined integer) ringing signal and a (k+1)-th ringing signal, comprising: ringing signal detection means for detecting the ringing signals transmitted from the network; originator detection means for detecting the originator identification signal transmitted from the network; and control means. The control means notifies the user of the communication terminal of originator identification data corresponding to the originator identification signal detected by the originator detection means, and starts to notify the user of an incoming call in accordance with the ringing signals detected by the ringing signal detection means after the notification of the originator identification data is started.

Alternatively, the control means notifies the user of the communication terminal of the originator identification data corresponding to the originator identification signal detected by the originator detection means, and prohibits the notification of the incoming call to the user of the communication terminal during a time period from the detection of a first ringing signal by the ringing signal detection means to the notification of the originator identification data to the user of the communication terminal.

In the invention constructed as above, the notification of the incoming call is started after the start of the notification of the originator identification data. This means that the user is already notified of the originator identification data when he or she has noticed the occurrence of the incoming call from the notification thereof, and therefore he can reliably know the identification data.

To attain the second object, the communication terminal is constructed such that the notification of the originator identification data and that of the incoming call are performed at the same time. This structure enables the occurrence of the incoming call to be notified to the user after the originator identification data is reliably notified to him.

Further, the following structures i) and ii) may be employed to perform the notification of the originator identification data and that of the incoming call at the same time:

i) A first structure which employs means for generating a pseudo ringing signal similar to the ringing signal detected by the ringing signal detection means. In this structure, the notification of the originator identification data corresponding to the originator identification signal is started when the signal has been detected, and the pseudo ringing signal is generated to notify the incoming call within a time period from the start of notification of the originator identification data to the detection of the (k+1)-th ringing signal. This structure enables notification of the incoming call with the use of the pseudo ringing signal before the detection of the (k+1)-th ringing signal, which means that the occurrence of the incoming call can be notified to the user promptly.
 ii) A second structure which employs a memory for storing the originator identification data corresponding to the detected originator identification signal. In this structure, the detected originator identification data is read from the memory and notified in synchronism with the notification of the incoming call performed upon detection of the (k+1)-th ringing signal. Although in this structure, the start of notification of the incoming call and the originator identification data is retarded as compared with the first structure, the pseudo ringing signal is not necessary.

To attain the third object, the communication terminal has the following structures i) and ii):

i) The user is notified of that the originator identification signal is being received, during a time period from the detection of the first ringing signal to the detection of the originator identification signal.
 ii) The user is notified of that an operation for sending a call is prohibited, during a time period from the detection of the first ringing signal to the detection of the originator identification signal.

By virtue of the above structures, the user can be indirectly notified of that the incoming call is being received, which reduces the number of occasions where the user performs an off-hook operation for generating an outgoing call signal without being aware of the occurrence of the incoming call.

To attain the fourth object, the communication terminal of the invention continues the notification of the originator identification data for a predetermined time period even after the user's operation for responding to the incoming call is detected. Therefore, the user can confirm the originator identification data even during talking.

To attain the fifth object, the communication terminal of the invention is adapted to invalidate a response of the user to the incoming call during a time period from the start of notification of the incoming to the notification of the originator identification data. Accordingly, even if the user performs an operation for responding to the incoming call before the notification of the originator identification data, the request for responding to the incoming call is not received until the originator identification is detected and notified to the user. As a result, the transmission of the incoming call signal from the analog network is prevented from being stopped before the transmission of the originator identification data, and therefore the originator identification data from the analog network can be reliably detected and notified.

Moreover, it may be constructed such that the user is notified that an operation for responding to the incoming call is prohibited while the response thereto is invalidated. This structure enables the user not to perform a response to the incoming call during the response invalidated period. Further, even when the user has performed such an operation irrespective of the prohibition, the operation is invalidated and the originator identification data can reliably be notified to the user.

To attain the sixth object, there is provided a key telephone system which employs control means for detecting the originator identification signal supplied from the analog network, and notifying the user of originator identification data corresponding to the originator identification signal. Further, the control means notifies the user of an incoming call after the display of notification of the originator identification data is started. Since the notification of the originator identification data is started before the notification of the incoming call is started, the user is notified of the originator identification data before he recognizes the occurrence of the incoming call from its notification. Thus, the user can reliably obtain the originator identification data.

The above-described control operation may be performed by the key telephone control unit only, or by each key telephone, or by both the key telephone control unit and each key telephone.

To attain the seventh object, there is provided a key telephone system in which a response of the user to the incoming call is invalidated during a time period from the start of notification of the incoming call to the start of notification of the originator identification data. Therefore, even if the user performs an operation for responding to the incoming call before the notification of the originator identification data, the request for responding to the incoming call is not received until the originator identification data is detected and notified to the user. Accordingly, the transmission of the incoming call signal from the analog network is prevented from being stopped before the transmission of the originator identification data, and therefore the originator identification data from the analog network can be reliably detected and notified.

The above-described structures are applicable not only to a key telephone system but also to a private branch exchange, a telephone apparatus, or an adaptor apparatus interposed between an analog network and a communication terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram, showing an extension interface unit incorporated in the key telephone system shown in FIG. 2;

DETAILED DESCRIPTION OF THE PREFERRED EMBODIMENTS

First Embodiment

In a first embodiment, a key telephone system is connected to an analog telephone network with an originator notification function, and is provided with a notification control function according to the invention. The notification control function causes an incoming call to be notified after the notification of originator identification data.

Figure 1:
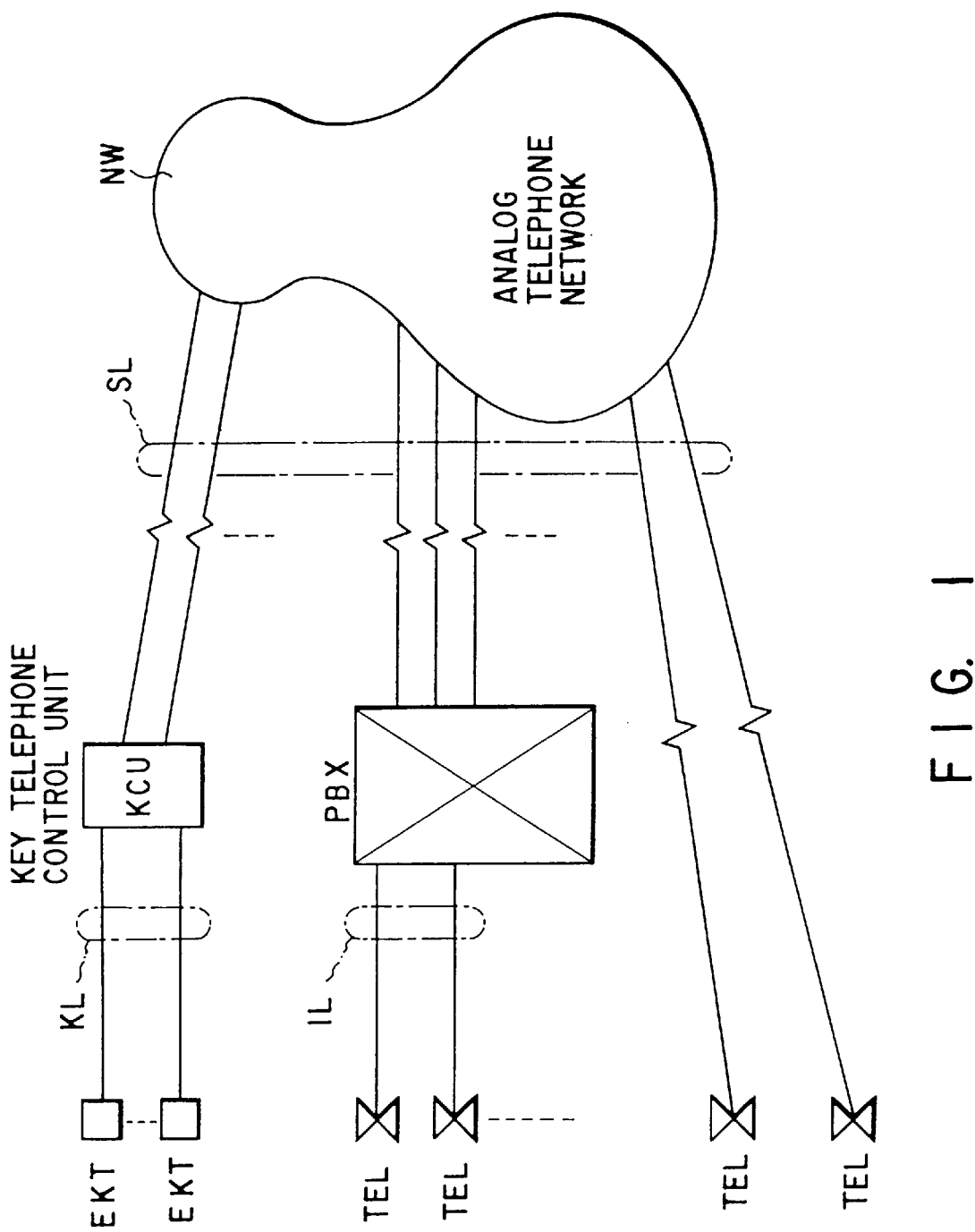
FIG. 1 is a schematic view, showing a communication system according to a first embodiment of the invention.

Referring to FIG. 1, an analog telephone network NW is connected, via a single or a plurality of subscriber lines SL, to a key telephone system, a private branch exchange system and telephones, which serve as subscriber communication terminals. The key telephone system consists of a key telephone control unit KCU connected to the subscriber lines SL, and a plurality of key telephones EKT connected to the control unit KCU via key telephone lines KL. The private branch exchange system consists of a private branch exchange PBX connected to the subscriber lines SL, and a plurality of key telephones TEL connected to the exchange PBX via extension lines IL.

The analog telephone network NW has a service function for supplying a destination subscriber communication terminal with a notice of originator identification data. When a request for a call to a subscriber communication terminal connected to an analog telephone network NW has transmitted to the network, the above service function is executed to mix a signal indicative of the originator identification data into an incoming call signal to be transmitted to the terminal, thereby supplying the subscriber communication terminal with a notice of originator identification data. The request for a call can be sent either from a subscriber communication terminal connected to an analog telephone network NW to which a destination terminal belongs, or from a subscriber communication terminal connected to another analog telephone network (in this case, via a relay line). When a request for call has been sent from a subscriber communication terminal connected to an analog telephone network to which a destination subscriber terminal belongs, identification data for identifying an originator is created by the analog telephone network. On the other hand, when a request for a call has been sent from a subscriber communication terminal connected to another analog telephone network, the originator identification data is transmitted from the another analog telephone network, together with the request for the call.

Figure 7:
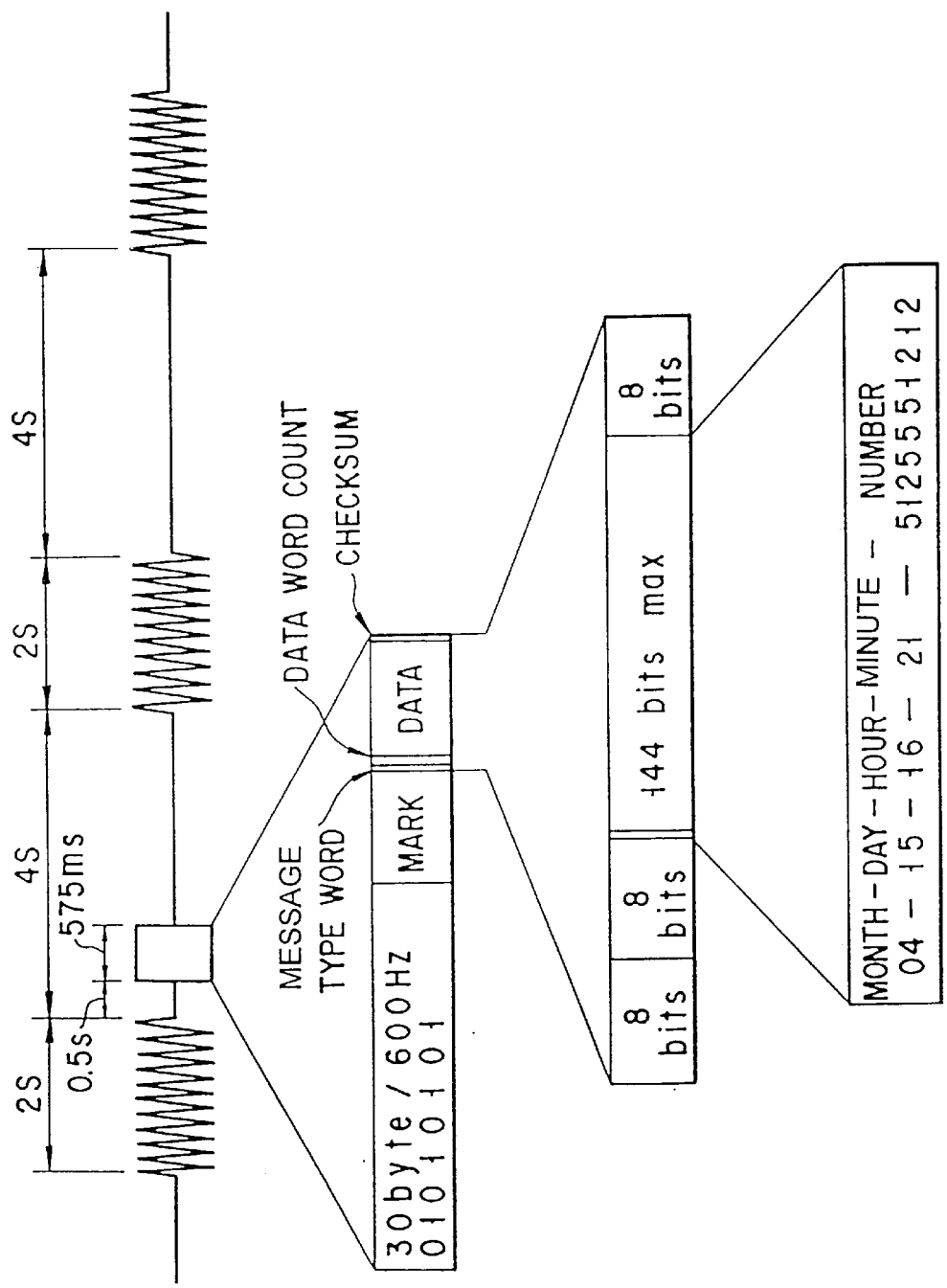
FIG. 7 is a view, showing a format of an incoming call signal and notification data.

FIG. 7 shows an example of a format of an incoming call signal and notification data to be transmitted to a subscriber communication terminal. The incoming call signal consists of a ringing signal with a predetermined frequency which continues two seconds and is repeatedly transmitted at intervals of four seconds. The notification data is transmitted in an interval between the first and second ringing signals of the incoming call signal. A pose period of 0.5 seconds is inserted between the termination point of the first ringing signal and the start point of the notification data. The transmission period of the notification data is 575 ms.

The notification data contains a synchronization signal of a "01"-repeated pattern, a mark, a message-type word, a data count word, a data section and a check sum. Each of the message type word, the data count word, and the check sum is 8-bit data. The length of the data portion is set to a maximum of 144 bits. The originator identification data, which includes "date and hour" and "originator number", is inserted in the data portion. The "date and hour" indicates the date and hour of an incoming call from an originator, while the "originator number" indicates a subscriber number imparted to the originator.

Figure 2:
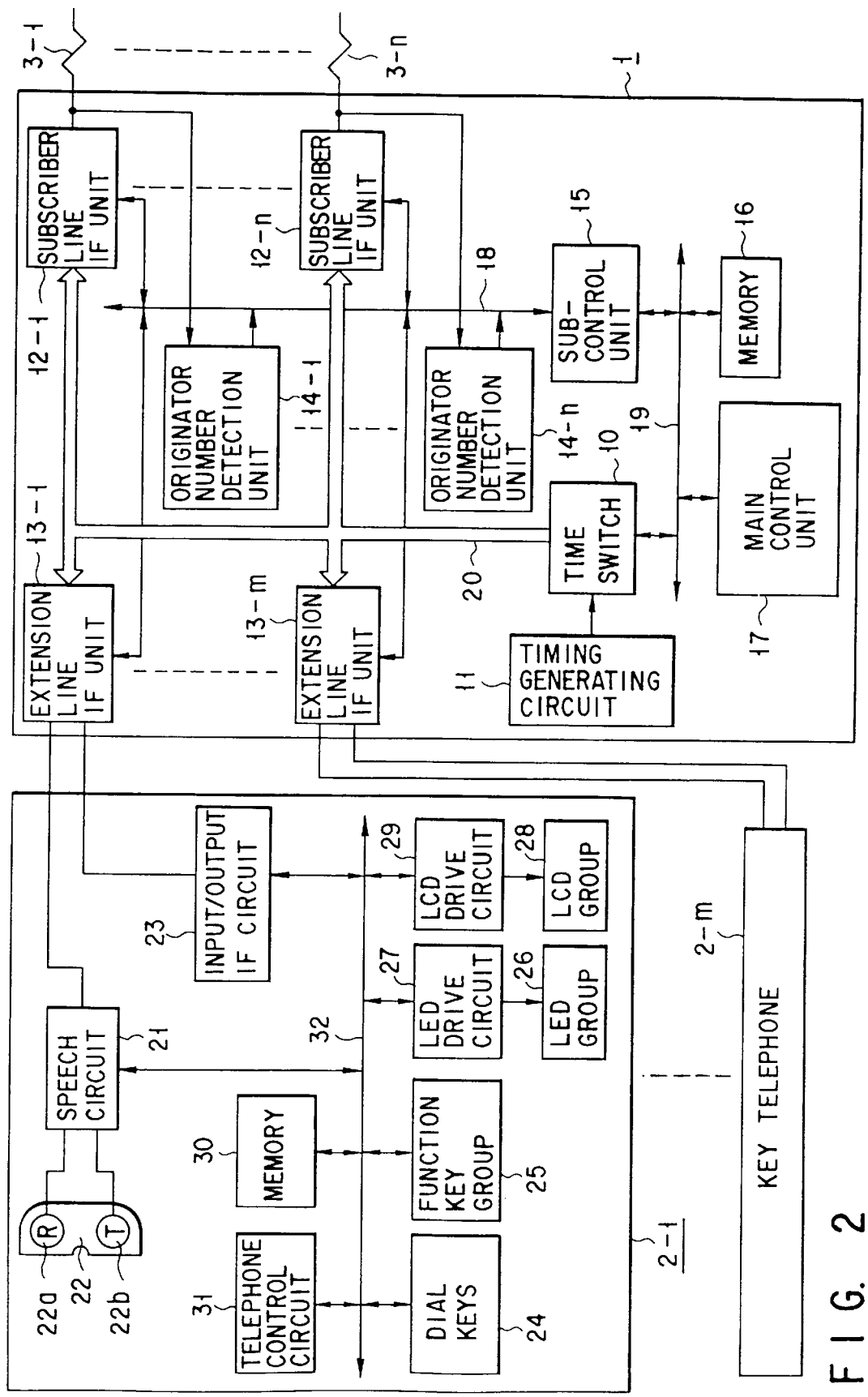
FIG. 2 is a block diagram, showing a key telephone system according to the first embodiment of the invention.

The key telephone system having a notification control function according to the invention is constructed as follows:

FIG. 2 is a block diagram, showing the circuit structure of the system. As is shown in FIG. 2, the key telephone system comprises m key telephones 2 (2-1–2-m) connected to a key telephone control unit 1.

The key telephone control unit 1 has a time switch 10, a timing generating circuit 11, n subscriber-line interface units 12 (12-1–12-n), m extension interface units 13 (13-1–13-n), n originator number detection units 14 (14-1–14-n), a sub control unit 15, a memory 16 and a main control unit 17. The subscriber-line interface units 12, the extension interface units 13 and the originator number detection units 14 are connected to the sub control unit 15 via a data highway 18. The time switch 10, the sub control unit 15 and the memory 16 are connected to the main control unit 17 via a bus 19.

The time switch 10 is connected to the subscriber-line interface units 12 and the extension interface units 13 via a PCM highway 20. The time switch 10 exchanges time slots on the PCM highway 20 on the basis of the control of the main control unit 17 and various timing signals generated by the timing generating circuit 11. The connection between the subscriber-line interface units 12 and the extension interface units 13 or between the extension interface units 13 is changed by exchanging the time slots.

Figure 3:
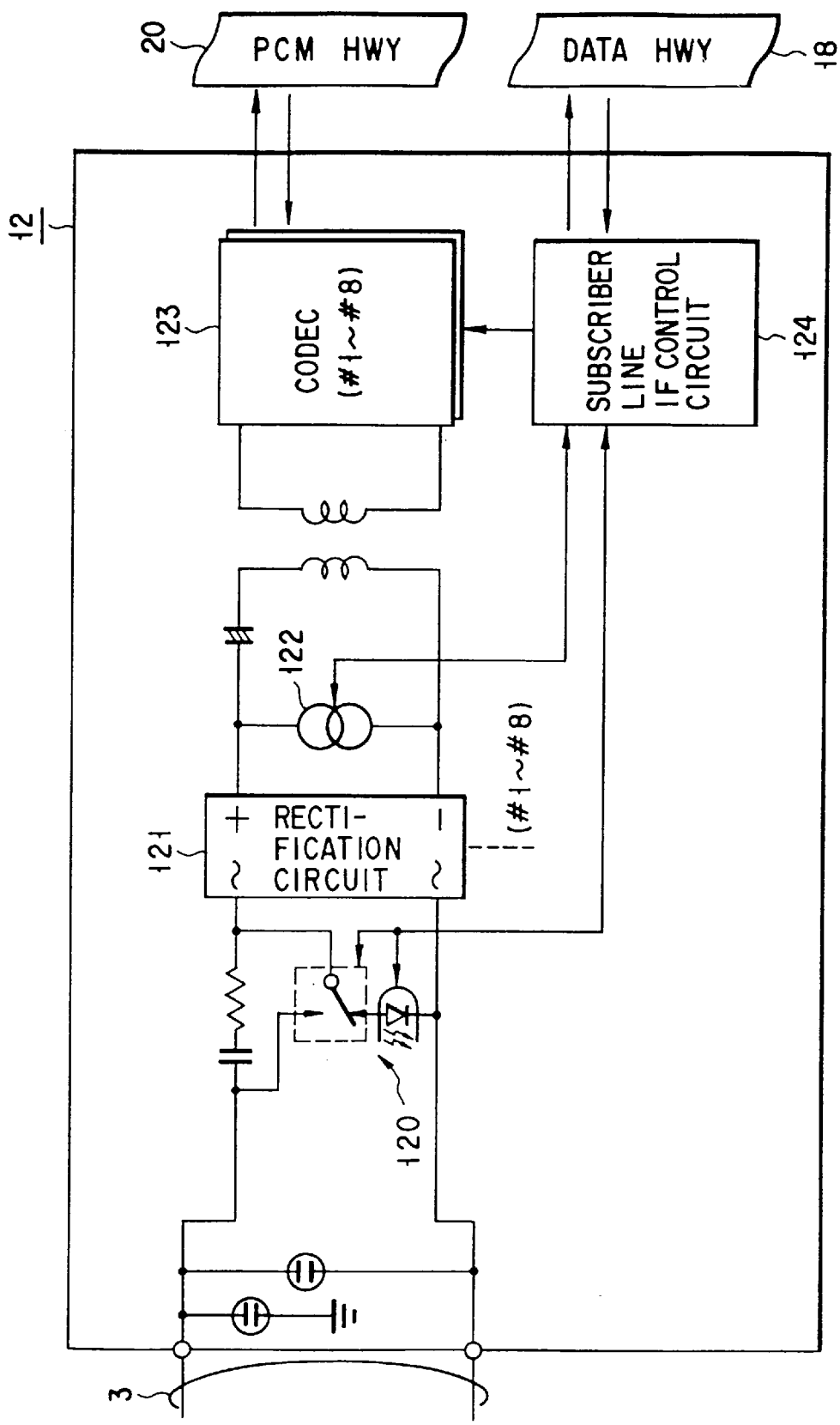
FIG. 3 is a block diagram, showing a subscriber-line interface unit incorporated in the key telephone system shown in FIG. 2.

The subscriber-line interface units 12 (12-1–12-n) are connected to subscriber lines 3 (3-1–3-n), respectively. As is shown in FIG. 3, each subscriber-line interface unit 12 has an incoming call detection circuit 120, a rectification circuit 121 consisting of a diode bridge, a DC current control circuit 122, a Codec (coder/decoder) 123, and a subscriber-line interface control unit 124. The Codec 123 performs PCM encoding/decoding of a voice signal. The subscriber-line interface control unit 124 controls the subscriber-line interface unit (controls, for example, detection of an incoming call, seizure of a subscriber line, transmission using a dial, etc.) under the control of the main control unit 17. The subscriber-line interface unit 12 performs a subscriber-line interface operation for the analog telephone network NW. The subscriber-line interface operation includes conversion of an analog voice signal transmitted via each subscriber line 3, to a PCM signal, conversion of the PCM signal supplied via the time switch 10, to an analog voice signal, monitoring of the state of each subscriber line 3, transmission of various signals to the analog telephone network NW connected to the interface unit 12 via the subscriber lines 3, etc. Further, the subscriber-line interface unit 12 sends and receives control data relating to the subscriber-line interface operation, to and from the main control unit 17 via the sub control unit 15.

The extension interface units 13 (13-1–13-m) are connected to the key telephones 2 (2-1–2-m), respectively. As is shown in FIG. 4, each extension interface unit 13 has an extension interface control unit 130, a memory 131 and a digital transmission unit 132. The extension interface control unit 130 transmits control data via the data highway 18. The memory 131 serves as an external memory of the control unit 130. The digital transmission unit 132 transmits control data and voice data between the key telephone 2 and the key telephone control unit 1. Further, the extension interface unit 13 performs an extension interface operation for the key telephones 2. The extension interface operation includes conversion of an analog voice signal from the key telephones 2, to a PCM signal, conversion of a PCM signal supplied to the extension interface unit via the time switch 11, to an analog voice signal, monitoring of the key telephones 2, transmission of various signals to the key telephones 2, etc. Moreover, each extension interface unit 13 receives and sends control data relating to the extension interface operation, to and from the main control unit 17 via the sub control unit 15.

Figure 5:
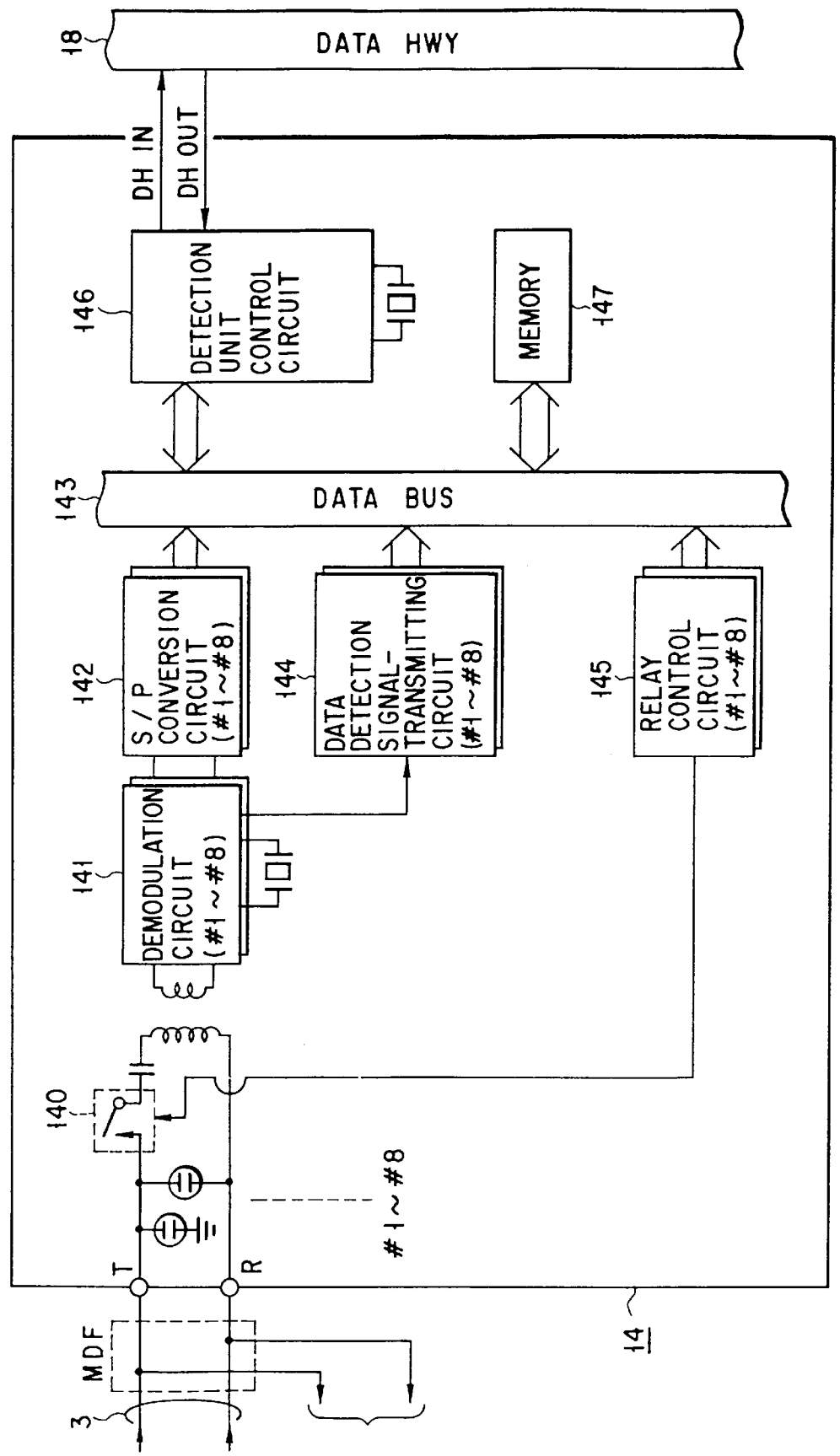
FIG. 5 shows an originator number detection unit incorporated in the key telephone system shown in FIG. 2.

The originator number detection units 14 (14-1–14-n) are connected to the subscriber lines 3 (3-1–3-n), respectively. As is shown in FIG. 5, each originator number detection unit 14 comprises a relay 140, a demodulation circuit 141, a serial/parallel conversion unit 142, a data detection signal-transmitting unit 144, a relay control unit 145, a detection unit control section 146, and a memory 147.

The relay 140 is used to disconnect the originator number detection units 14 from the subscriber lines 3. The demodulation circuit 141 receives a modulated signal (notification data signal) from the analog telephone network NW via the subscriber lines 3, and then demodulates the signal to detect the originator identification data. The serial/parallel conversion unit 142 converts, to a parallel signal, a serial signal supplied from the demodulation circuit 141 and indicative of the originator identification data. The data detection signal-transmitting unit 144 transmits the originator identification data from the modulation circuit 141, to an internal data bus 143. The notification data is transmitted to the main control unit 17 via the sub control unit 15. The relay control unit 145 controls the relay 140 so as to disconnect the originator number detection unit 14 from the subscriber line 3 and perform impedance matching at the time of a dial operation or of talking. The detection unit control section 146 controls the originator number detection unit 14. The memory 147 is used as an external memory of the detection unit control section 146.

The sub control unit 15 mainly comprises a micro computer, for example, and transmits data between the main control unit 17 and the subscriber-line interface unit 12, the extension interface unit 13 and the originator number detection unit 14. The memory 16 is used as an external memory of the main control unit 17 for storing various data pieces.

The main control unit 17 mainly comprises, for example, a microcomputer, and has an incoming call control function and a response-inhibiting function, as well as general control functions to be employed in the key telephone control unit 1. Incoming call control means performs processing for causing the key telephone 2 to ring after the originator identification data is detected from an incoming call signal transmitted. Response inhibiting means performs processing for inhibiting response to an incoming call by the key telephone 2 for a predetermined period.

The key telephone 2 is constructed as follows:

The key telephone 2 has a speech circuit 21, a handset 22, an input/output interface circuit 23, dial keys 24, a function key group 25, an LED group 26, an LED driving circuit 27, an LCD 28, an LCD driving circuit 29, a memory 30 and a telephone control unit 31. The speech circuit 21, the input/output interface circuit 23, the dial keys 24, the function key group 25, the LED driving circuit 27, the LCD driving circuit 29, and the memory 30 are connected to the telephone control unit 31 via a bus 32.

The speech circuit 21 is connected to the handset 22 and the extension interface unit 13 of the key telephone control unit 1. The earpiece speaker 22b of the handset 22 is driven by a voice signal supplied from the extension interface unit 13, a voice signal output from the microphone 22b of the handset 22 is transmitted to the extension interface unit 13.

The input/output interface circuit 23 is connected to the extension interface unit 13 for receiving and outputting data to be transmitted between the key telephone control unit 1 and the key telephone 2. The dial keys 24 comprise 12 keys consisting of numeral keys "0"–"9", and symbol keys "*" and "#". These keys are used by the user to input to the telephone control unit 31 various data pieces including dial data.

The function key group 25 consists of a plurality of function keys for executing a function for designating a subscriber line to catch, etc. The user pushes the function keys to cause the telephone control unit 31 to execute the functions.

The LED group 26 consists of a plurality of LEDs corresponding to the function keys of the function key group 25. Each of the LEDs indicates whether or not the function assigned to a corresponding function key is executed. The LED driving circuit 27 drives each LED of the LED group 26 under the control of the telephone control unit 31. The LCD 28 displays various data for the user. The LCD driving circuit 29 drives the LCD 28 under the control of the telephone control unit 31.

The telephone control unit 31 is mainly constituted, for example, by a microcomputer, and controls each of the key telephones 2. The memory 30 stores all data items necessary for the control unit 31 to perform various processing.

Figure 6:
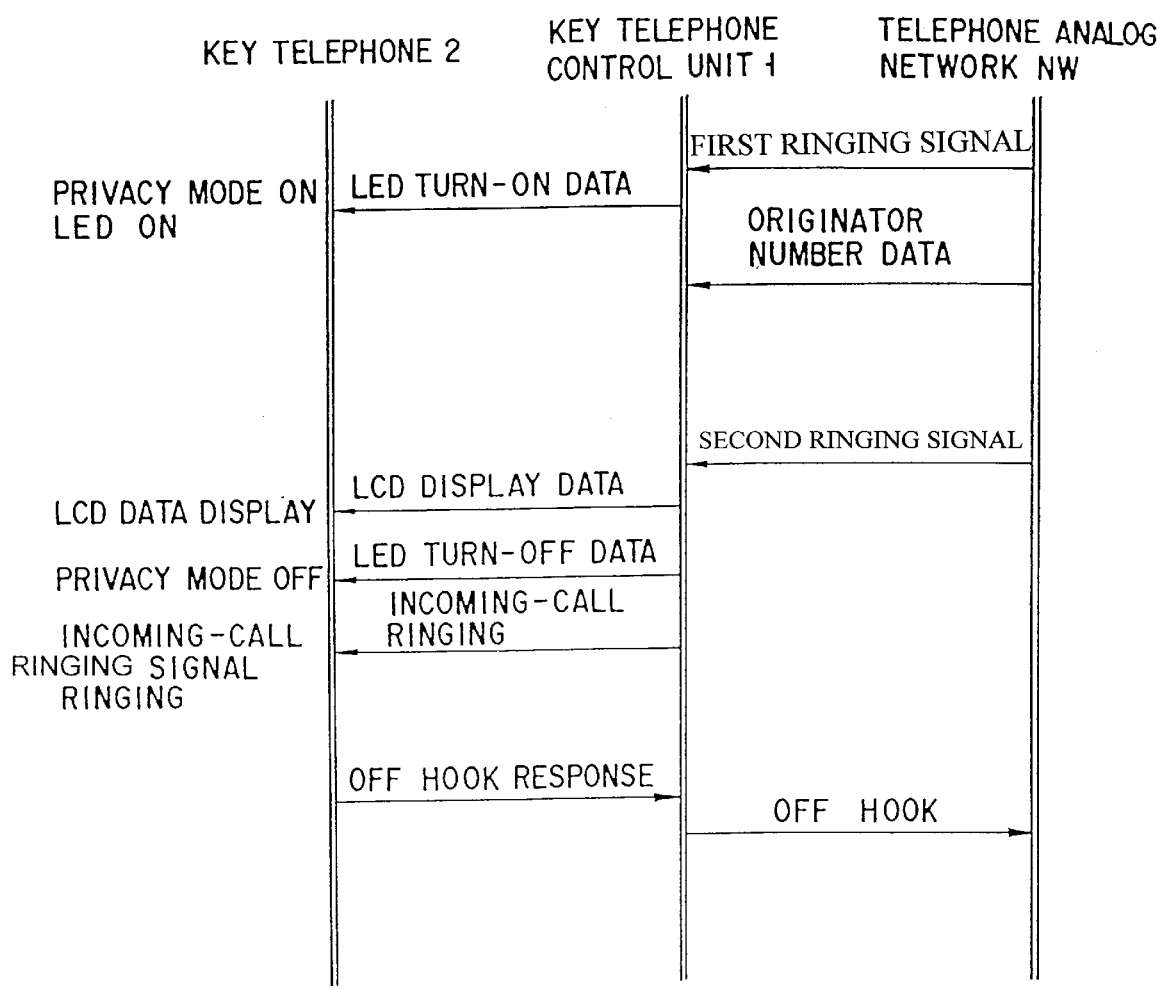
FIG. 6 is a view, showing a data sequence useful in explaining the operation of the key telephone system of FIG. 2.

An explanation will be given of how the key telephone system, constructed as above, receives an incoming call, referring to FIGS. 6 and 7.

Suppose that a first ringing signal has been supplied from the analog telephone network NW via the subscriber line 3-1. At this time, the first ringing signal is detected by the incoming call detecting circuit 120 of the subscriber-line interface unit 12-1 connected to the subscriber line 3-1. A notice of the detection of the first ringing signal is given from the subscriber-line interface control unit 124 to the main control unit 17 via the data highway 18, the sub control unit 15 and the bus 19.

Upon receiving the notification of the detection of the first ringing signal, the main control unit 17 sets a privacy mode for the subscriber line 3-1, and supplies the key telephones 2-1–2-m with LED-lighting data, thereby continuously lighting the LED of the key corresponding to the subscriber line 3-1. In other words, in each of the key telephones 2-1–2-m, that LED of the LED group 26 which corresponds to the subscriber line 3-1 is lighted, which indicates that the subscriber line 3-1 cannot be used now. At this time, even if that key of the function key group 25 which is provided for selecting the subscriber 3-1 is pushed, the main control unit 17 ignores this. Thus, the transmission of a call from the key telephones 2-1–2-m to the subscriber line 3-1 is prohibited.

Then, suppose that notification data which contains the originator identification data has been supplied from the analog telephone network NW, following to the first ringing signal. The notification data is demodulated by the demodulation circuit 141 in the originator number detection unit 14-1, reproducing the originator identification data. The originator identification data is converted to a parallel signal by the serial/parallel conversion unit 142, and then transmitted to the main control unit 17 via the internal data bus 143, the detection unit control section 146, the data highway 18, the sub control unit 15 and the bus 19. Upon receiving the originator identification data, the main control unit 17 decodes and stores the date/hour and the originator number contained in the identification data, and then waits the supply of a second ringing signal.

When 4 seconds have elapsed after the transmission of the notification data including the originator identification data and the transmission of the first ringing signal, the analog telephone network NW transmits the second ringing signal to the subscriber line 3-1. Then, the subscriber-line interface unit 12-1 detects the second ringing signal in the same manner as the first ringing signal, and gives a notice of the detection of the second ringing signal to the main control unit 17. Upon notification of the detection of the second ringing signal, the main control unit 17 supplies the key telephones 2-1–2-m with LCD display data containing the date/hour and the originator number.

In each of the key telephones 2-1–2-m, the LCD display data is fetched by the input/output interface circuit 23, and then supplied to the LCD driving circuit 29 via the bus 32. The LCD driving circuit 29 drives the LCD 28 under the control of the telephone control unit 31. As a result, the LCD 28 displays the date/hour and the originator number.

Subsequently, the main control unit 17 of the key telephone control unit 1 supplies the key telephones 2-1–2-m with LED-flickering data substantially at the same time as the transmission of the LCD display data of the date/hour and the originator number. Further, main control unit 17 cancels the privacy mode, then generates an incoming call signal in synchronism with the ringing signal, and transmits the signal to the key telephones 2-1–2-m. As a result, in each of the telephones 2-1–2-m, the LED of a key corresponding to the subscriber line 3-1 is lighted, and the telephone rings. Thus, the user is notified of an incoming call on subscriber line 3-1. At the same time as the start of the notification of the incoming call, each of the key telephones 2-1–2-m starts to receive the response to the incoming call by pushing a predetermined key of the function key group 25 for selecting the subscriber line 3-1.

In this state, suppose that the user of the key telephone 2-1 has pushed the key corresponding to the subscriber line 3-1 so as to respond to the incoming call. Then, the key input is received by the telephone control unit 31 of the key telephone 2-1, and then transmitted to the main control unit 17 via the bus 32, the input/output interface circuit 23, the extension interface unit 13-1, the data highway 18 and the bus 19. The main control unit 17, in turn, supplies the subscriber-line interface unit 12-1 with an instruction to execute an off-hook operation, thus responding to the incoming call through the subscriber line 3-1.

As described above, in the key telephone system according to the first embodiment, there is no flickering of the LED 26 or no telephone ringing for indicating an incoming call at the key telephone 2-1–2-m, when the first ringing signal has been transmitted from the analog telephone network NW. The LED 26 flickers and the telephone rings to indicate the incoming call for the first time when the second ringing signal has been received. By virtue of this structure, the user is kept unaware of the incoming call during the time period from the arrival of the first ringing signal to the arrival of the second ringing signal, and hence does not respond thereto. Accordingly, the analog telephone network NW can reliably transmit the originator identification data without the transmission of the incoming call signal interrupted. Thus, the key telephone system can reliably detect the originator identification data from the analog telephone network NW, and display the data on the LCD 28 of each of the key telephones 2-1–2-m.

Further, in the first embodiment, during the time period from the arrival of the first ringing signal to the arrival of the second ringing signal, the privacy mode is set in each of the key telephones 2-1–2-m in respect of that one of the subscriber lines 3 at which an incoming call has occurred, thereby preventing further key operation for selecting the subscriber line now being used. Therefore, even if the user performs an operation for sending a call, this operation is ignored during the time period from the arrival of the first ringing signal to the arrival of the second ringing signal. Thus, the analog telephone network NW transmits the originator identification data without the transmission of the incoming call signal interrupted. As a result, the key telephone system can reliably detect the originator identification data from the analog telephone network NW, and display the data on the LCD 28 of each of the key telephones 2-1–2-m.

Moreover, since in the first embodiment, the LED 26 is lighted while the originator identification data is waited after the detection of the first ringing signal, this enables the user to easily understand the reason why the operation for sending a call is ignored.

In addition, since in the embodiment, the display of the originator identification data on the LCD 28 and the ringing of the telephone are performed substantially simultaneously when the second ringing signal has been received, the user does not have to wait until the originator identification data is displayed. In other words, when the user has heard the telephone ringing and looked at the LCD 28, the originator identification data has already been displayed thereon or is displayed promptly.

The above-described embodiment can be modified in various manners. For example, although in the embodiment, the display of the originator identification data on the LCD 28 and the ringing of the telephone are performed substantially simultaneously when the second ringing signal has been received, this processing can cause the following disadvantage. During the time period from the arrival of at least the first ringing signal to the arrival of the second ringing signal, i.e., during 6 seconds, the incoming call is not notified to the user. Therefore, the call originator may at worst imagine that the person who the originator wants to contact is absent, and stop the call.

The disadvantage can be avoided by starting the display of the originator identification data and the notification of the incoming call upon detection of the originator identification data. In this case, the notification of the incoming call is performed by generating a pseudo call signal upon detection of the originator identification data, and causing the key telephone to ring in response to the pseudo call signal generated.

Thus, the key telephone can notify the user of the incoming call immediately after the detection of the originator is identification data. More specifically, the user is notified of the incoming call when 3 or 4 seconds has elapsed after the detection of the first ringing signal. Thus, a response to the incoming call can be performed relatively promptly, minimizing erroneous recognition of the originator.

Further, although in the first embodiment, the LED 26 is lighted while the originator identification data is awaited after the detection of the first ringing signal, it may be modified such that a message that the originator identification data is being received is displayed on the LCD 28 to indirectly restrain the operation of sending a call or a response to the incoming call, or a message that the operation of sending a call or a response to the incoming call is prohibited is displayed on the LCD 28. At this time, a voice message may be generated from a voice synthesizer circuit and output from the key telephone, instead of flickering the LED 26 or displaying a message on the LCD 28. This enables the user to recognize the message more clearly.

In addition, it is effective to continue the display of the originator identification data for a predetermined time even after the user responds to the incoming call. The display may be continued until the entire speech is finished, or until a limited time such as about 1 minute elapses from the start of speech. Moreover, it may be constructed such that the received originator identification data is registered in a memory, and read therefrom and displayed again when the user has performed a predetermined display operation after completion of the display.

Second Embodiment

The second embodiment is characterized in that an electronic private branch exchange system is connected to an analog telephone network having an originator notification function, and a notification control function according to the invention is imparted to the electronic private branch exchange system. The notification control function causes a user to be notified of the incoming call after the notification of the originator identification data.

Figure 8:
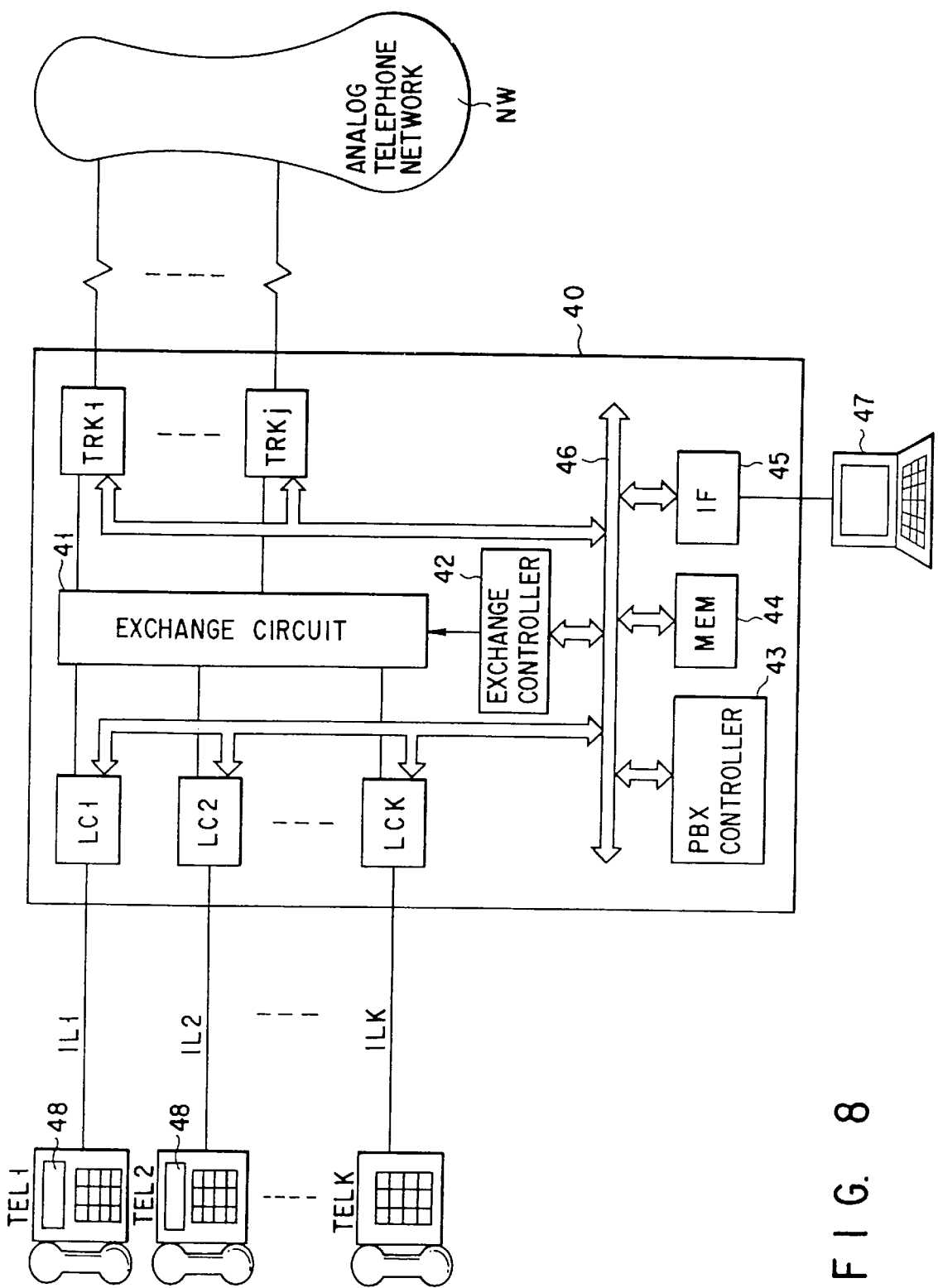
FIG. 8 is a block diagram, showing an electronic private branch exchange according to a second embodiment of the invention.

FIG. 8 is a block diagram, showing the electronic private branch exchange system according to the second embodiment. This system comprises an electronic private branch exchange 40 connected to the analog telephone network NW via a plurality of subscriber lines, a plurality of extension telephones TEL1–TELk connected to the exchange 40 via extension lines IL1–ILk, respectively, and a maintenance terminal device 47 provided as an auxiliary element of the exchange 40. Some of the extension telephones TEL1–TELk may have LCD displays and others may not have such displays.

The electronic private branch exchange 40 comprises subscriber-line interface circuits TRK1–TRKj each connected to a corresponding subscriber line, extension interface circuits LC1–LCk connected to the extension telephones TEL1–TELk via the extension lines IL1–ILk, respectively, an exchange circuit 41, an exchange control unit 42, a PBX controller 43, a memory circuit (MEM) 44 and an external interface circuits (IF) 45.

Each of the subscriber-line interface circuit TRK1–TRKj performs subscriber-line interface operations such as capture of a corresponding subscriber line and detection of an incoming call transmitted therethrough. Further, the subscriber-line interface circuits TRK1–TRKj have a function for detecting the notification data supplied from the analog telephone network NW, reproducing the originator identification data contained therein, and supplying the PBX controller 43 with a notice of the reproduced data.

Each of the extension interface circuits LC1–LCk performs extension interface operations such as detection of an outgoing call signal transmitted through a corresponding extension line IL1–ILk, and transmission of an incoming call signal through the same. Further, the extension interface circuits LC1–LCk have a function for ignoring, under the control of the PBX controller 43, an outgoing call signal from an extension telephone to which an incoming call signal has occurred, during the time period from the detection of the first ringing signal of the incoming call signal to the detection of the originator identification data.

The exchange circuit 41 changes, under the control of the exchange control unit 42, the connection between the extension interface circuits LC1–LCk and between the extension interface circuits LC1–LCk and the subscriber-line interface circuits TRK1–TRKj.

The memory circuit 44 is formed of a semiconductor memory such as a ROM or a RAM, or a hard disk, which stores a control program or various control data pieces for the PBX controller 43. The maintenance terminal device 47 consists, for example, of a personal computer, and is used to change the control data pieces or set new control data pieces required for control of the PBX controller 43.

The PBX controller 43 includes, for example, a microcomputer as a main component, and has a function for controlling the time point of the notification of the incoming call and that of the originator identification data. By virtue of this function, when the analog telephone network NW has generated an incoming call signal to an extension telephone, an extension interface circuit corresponding to the extension telephone is supplied with an instruction to ignore a outgoing call from the extension telephone until a corresponding subscriber-line interface circuit detects the originator identification data. At the same time, the extension interface circuit is instructed to stop the transmission of the incoming call signal to the extension telephone during the time period from the detection of the first ringing signal of the incoming call signal to the detection of the originator identification data.

As described above, in the electronic private branch exchange system of the second embodiment, when the analog telephone network NW has generated an incoming call signal to an extension telephone, the PBX controller 43 supplies an extension interface circuit corresponding to the extension telephone with instructions to prohibit the transmission of the incoming call signal and the reception of an outgoing call signal during the time period from the detection of the first ringing signal of the incoming call signal by a corresponding subscriber-line interface circuit to the detection of the originator identification data by the subscriber-line interface circuit.

Accordingly, the extension telephone to which an incoming call has occurred is prevented from ringing until the originator identification data is detected, and therefore the user does not perform an operation for responding to the incoming call. Further, if the user performs an operation for sending a call before the originator identification data is detected, this operation is ignored by the extension interface circuit. As a result, the outgoing call is prevented from being sent to the analog telephone network NW as a response to the incoming call. This means that the originator identification data is reliably transmitted from the analog telephone network NW to a destination telephone.

The above-described second embodiment can be modified in the following manner. The extension telephones TEL1–TELk include a telephone with a display 48 such as TEL1 or TEL2, and a telephone with no display such as TELk. If an incoming call is transmitted to the telephone TELk with no display, it is not necessary to prevent the notification of the incoming call or the reception of an outgoing call from the telephone TELk until the originator identification data is detected.

This being so, when an incoming call signal to an extension telephone has occurred, it is determined whether or not the telephone has a function for displaying the originator identification data. If it is determined that the telephone does not have the display function, the incoming call signal is transmitted without stopping for the notification of the incoming call signal and prohibiting the reception of an outgoing call signal. Thus, the extension telephone TELk with no display 48 is quickly supplied with a notice of the incoming call signal, with unnecessary control interposed.

The second embodiment, too, can be modified in various manners like the first embodiment.

Third Embodiment

A third embodiment of the invention is characterized in that a telephone device with a display is connected to an analog telephone network having a originator notification function, and is provided with a notification control function according to the invention, which causes a user to be notified of the incoming call after the notification of the originator identification data.

Figure 9:
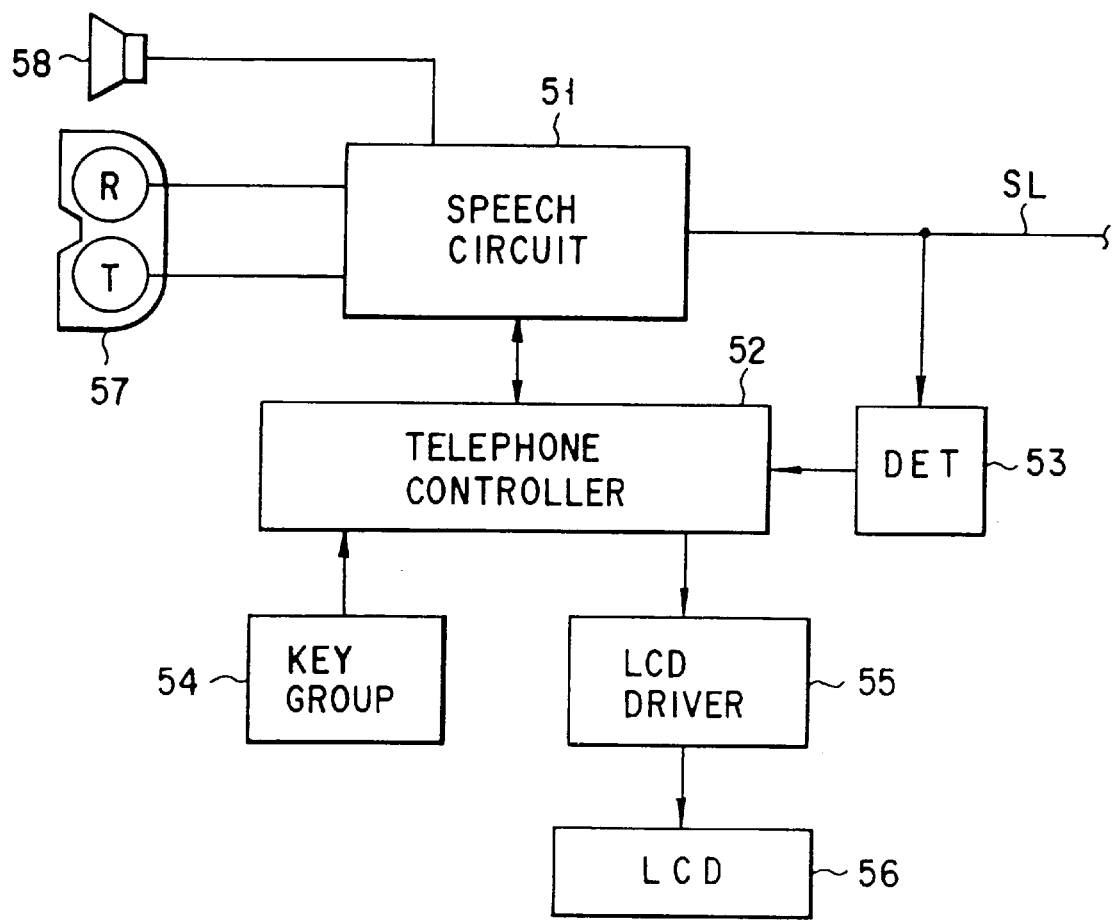
FIG. 9 is a block diagram, showing a telephone device according to a third embodiment of the invention.

FIG. 9 is a block diagram, showing the circuit of the telephone device with a display according to the third embodiment. As is shown in FIG. 9, on the operation panel of the telephone device, there are a key group 54 including dial keys and function keys, a display 56 and a speaker 58. The display 56 is, for example, a liquid crystal display (LCD). The display can display the time while an incoming call signal is awaited, and the originator identification data, the conversation time elapsed, etc. during conversation.

The internal circuit of the telephone device has a speech circuit 51 connected to a subscriber line SL, a telephone controller 52, a detection circuit (DET) 53 and an LCD driver 55. The speech circuit 51 is connected to a handset 57 and a speaker 58 for generating a ring to notify of the incoming call. The detection circuit 53 has a function for detecting a ringing signal and originator identification data transmitted from the analog telephone network via the subscriber line SL. The detection results are supplied to the telephone controller 52.

For example, the telephone controller 52 includes a microcomputer as a main component, and has a new function for controlling the timing of the notification of each of the originator identification data and the incoming call, as well as general functions relating to the speech operations. The new function is executed when the analog telephone network has generated an incoming call signal, so as to prevent the off-hook operation until the originator identification data is detected, and to cause the speaker 58 to ring after the detection of the originator identification data.

When in the telephone device constructed as above, the analog telephone network has generated an incoming call signal, no ring is generated and the off-hook operation is not allowed until at least the originator identification data is detected after detection of the first ringing signal by the detection circuit 53. Thus, the originator identification data can reliably be received and detected.

The third embodiment, too, can be modified in various manners like the first embodiment.

Fourth Embodiment

A fourth embodiment of the invention is characterized in that a standard telephone is connected, via an adaptor device, to a subscriber line of an analog telephone network having an originator notification function, and is provided with a display function for displaying the originator identification data and a notification control function according to the invention.

Figure 10:
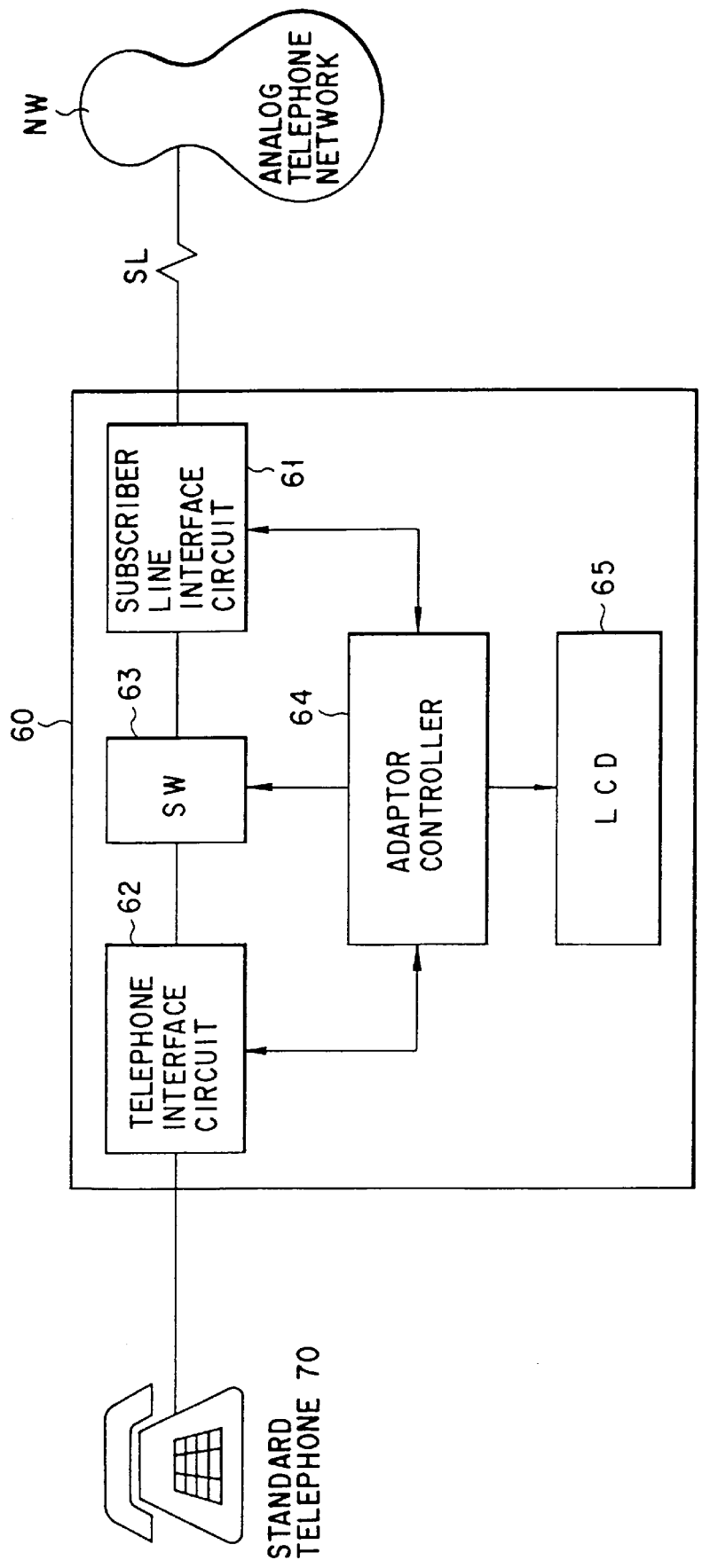
FIG. 10 is a block diagram, showing an adaptor device according to a fourth embodiment of the invention.

FIG. 10 is a block diagram, showing the circuit of the adaptor device according to the fourth embodiment. As is shown in FIG. 10, an adaptor device 60 comprises a subscriber-line interface circuit 61 connected to a subscriber line SL, a telephone interface circuit 62 connected to a standard telephone 70, a switch (SW) 63 for connecting the subscriber-line interface circuit 61 to the telephone interface circuit 62, an adaptor controller 64 and a liquid crystal display (LCD) 65.

The subscriber-line interface circuit 61 performs various subscriber-line interface operations such as capture of the subscriber line and detection of an incoming call signal. Further, the circuit 61 has a function for detecting notification data supplied from the analog telephone network NW, reproducing the originator identification data contained in the notification data, and supplying the adaptor controller 64 with the originator identification data.

The telephone interface circuit 62 performs various telephone interface operations such as detection of an outgoing call signal from the standard telephone 70 and transmission of an incoming call signal to the standard telephone 70. Further, the circuit 62 has a function, executed under the control of the adaptor controller 64, for ignoring the off-hook operation and stopping the supply of a signal for causing the speaker to ring.

On the basis of the detection results regarding the ringing signal and the originator identification data which are supplied from the subscriber-line interface circuit 61, the adaptor controller 64 supplies the telephone interface circuit 62 with an instruction to ignore the reception of an off-hook signal from the standard telephone 70 and stop the supply of a signal for causing the telephone 70 to ring, during the time period from the detection of the first ringing signal to the detection of the originator identification data. When the originator identification data has been detected, the controller 64 causes the LCD 65 to display the data.

By virtue of the LCD 65 of the adaptor device 60, even the user who uses the standard telephone 70 with no LCD can recognize the originator identification data. Further, since no incoming call signal is supplied to the standard telephone 70 during the time period from the detection of the first ringing signal to the reproduction of the originator identification data, the standard telephone 70 does not ring during that time period. This prevents the user from performing the off-hook operation for responding to the incoming call before the originator identification data is received. Moreover, since the off-hook operation of the standard telephone 70 is not allowed during the time period from the detection of the first ringing signal to the reproduction of the originator identification data, the originator identification data is reliably received even when the user has performed the off-hook operation for sending a call without being aware of the incoming call.

The fourth embodiment, too, can be modified in various manners like the first embodiment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A communication terminal connected via a subscriber line to a network having a function for transmitting a plurality of ringing signals to the communication terminal at regular intervals with an originator identification signal inserted in an interval between a k-th (k: a predetermined integer) ringing signal and a (k+1)-th ringing signal, comprising:

ringing signal detection means for detecting the ringing signals transmitted from the network;

originator detection means for detecting the originator identification signal transmitted from the network; and control means, connected to the ringing signal detection means and the originator detection means, for notifying a user of the communication terminal of originator identification data corresponding to the originator identification signal detected by the originator detection means, and starting to notify the user of an incoming call in response to detection by the ringing signal detection means of the (k+1)-th ringing signal, the control means notifying the user of the communication terminal that the originator identification signal is being received during a time period from the detection of a first ringing signal by the ringing signal detection means to the detection of the originator identification signal by the originator detection means.

2. The communication terminal according to claim 1, wherein the control means starts the notification of the originator identification data and that of the incoming call at the same time.

3. The communication terminal according to claim 1, wherein the control means stores in a memory the originator identification data corresponding to the originator identification signal detected by the originator detection means, and reads the stored data from the memory and sends the stored data in synchronism with the notification of the incoming call performed in accordance with the detection of the (k+1)-th ringing signal by the ringing signal detection means.

4. The communication terminal according to claim 1, wherein the control means notifies the user of the communication terminal that an operation for sending a call is prohibited, during a time period from the detection of the first ringing signal by the ringing signal detection means to the detection of the originator identification signal by the originator detection means.

5. The communication terminal according to claim 1, wherein the control means continues the notification of the originator identification data for a predetermined time period even after an operation for responding to the incoming call is performed at the communication terminal.

6. A key telephone system connected via at least one subscriber line to a network having a function for transmitting a plurality of ringing signals to the key telephone system at regular intervals, with an originator identification signal inserted in an interval between a k-th (k: a predetermined integer) ringing signal and a (k+1)-th ringing signal, comprising:

a key telephone control unit connected to the network via the at least one subscriber line; and a plurality of key telephones connected to the key telephone control unit via extension lines;

wherein the key telephone control unit includes
      ringing signal detection means for detecting the ringing signals transmitted from the network,
      originator detection means for detecting the originator identification signal transmitted from the network, and
      control means, connected to the ringing signal detection means and the originator detection means, for transmitting to at least one of the key telephones via corresponding ones of the extension lines, originator identification data corresponding to the originator identification signal detected by the originator detection means, the control means including means responsive to the ringing signals on and after the (k+1)-th ringing signal for transmitting an incoming call signal to the at least one of the key telephones via the corresponding ones of the extension lines; and wherein at least one of the plurality of key telephones includes
      means for receiving the originator identification data transmitted from the key telephone control unit via a corresponding one of the extension lines, and notifying a user of the key telephone of the received originator identification data, and
      means responsive to the incoming call signal transmitted from the key telephone control unit via the corresponding extension line, for notifying the user of the key telephone of an incoming call after notification of the received originator identification data is started.

7. The key telephone system according to claim 6, wherein the control means transmits to the key telephones the originator identification data corresponding to the originator identification signal detected by the originator detection means, and prohibits the transmission of the incoming call signal to the key telephones during a time period from detection of a first ringing signal by the ringing signal detection means to the transmission of the originator identification data to the key telephones.

8. The key telephone system according to claim 6, wherein the key telephones start notification of the received originator identification data and notification of the incoming call at the same time.

9. The key telephone system according to claim 8, wherein each key telephone stores in a memory the originator identification data from the key telephone control unit, reads from the memory the originator identification data in response to the incoming call signal transmitted from the key telephone control unit, and notifies the user of the key telephone of the incoming call and the originator identification data in a synchronized manner.

10. The key telephone system according to claim 6, wherein the control means of the key telephone control unit further includes means for transmitting a detection result of the ringing signal detection means to the key telephones via the extension lines when a first ringing signal is detected by the ringing signal detection means, and each of the key telephones further includes means for notifying, at a time between a time of reception of the detection result from the key telephone control unit and a time of reception of the originator identification data, the user of said each key telephone that the originator identification data is being received.

11. The key telephone system according to claim 6, wherein the control means of the key telephone control unit further includes means for transmitting a detection result of the ringing signal detection means to the key telephones via the extension lines when a first ringing signal is detected by the ringing signal detection means, and each of the key telephones further includes means for notifying, at a time between a time of reception of the detection result from the key telephone control unit and a time of reception of the originator identification data, the user of said each key telephone that any transmission operation is prohibited.

12. The key telephone system according to claim 6, wherein each of the key telephones starts notifying the user of the originator identification data when the incoming call is notified, and stops notifying the user of the originator identification data after a predetermined time period has elapsed after notification of the incoming call.

13. A key telephone system connected via at least one subscriber line to a network having a function for transmitting a plurality of ringing signals to the key telephone system at regular intervals, with an originator identification signal inserted in an interval between a k-th (k: a predetermined integer) ringing signal and a (k+1)-th ringing signal, comprising:

a key telephone control unit connected to the network via the at least one subscriber line; and a plurality of key telephones connected to the key telephone control unit via extension lines;

wherein the key telephone control unit includes ringing signal detection means for detecting the ringing signals transmitted from the network, originator detection means for detecting the originator identification signal transmitted from the network, control means, connected to the ringing signal detection means and the originator detection means, for transmitting to at least one of the key telephones via corresponding ones of the extension lines, originator identification data corresponding to the originator identification signal detected by the originator detection means, the control means including means responsive to the ringing signals on and after the (k+1)-th ringing signal for transmitting an incoming call signal to the at least one of the key telephones via the corresponding ones of the extension lines, pseudo incoming call signal means for generating a pseudo incoming call signal independent of a detection result of the ringing signal detection means, and means for transmitting the pseudo incoming call signal generated by the pseudo incoming call signal means to the key telephones via the extension lines; and wherein at least one of the plurality of key telephones includes means for receiving the originator identification data transmitted from the key telephone control unit via a corresponding one of the extension lines, and notifying a user of the key telephone of the received originator identification data, means responsive to the incoming call signal transmitted from the key telephone control unit via the corresponding extension line, for notifying the user of the key telephone of an incoming call after notification of the originator identification data is started, and means responsive to the pseudo incoming call signal transmitted from the key telephone control unit via the corresponding extension line, for notifying the user of the key telephone of a pseudo incoming call corresponding to the pseudo incoming call signal at a time between a start of notification of the received originator identification data and a start of notification of the incoming call.

14. A private branch exchange system connected via at least one subscriber line to a network having a function for transmitting a plurality of ringing signals to the private branch exchange system at regular intervals, with an originator identification signal inserted in an interval between a k-th (k: a predetermined integer) ringing signal and a (k+1)-th ringing signal, comprising:

a private branch exchange connected to the network via the at least one subscriber line; and a plurality of extension telephones corrected to the private branch exchange via extension lines;

wherein the private branch exchange includes ringing signal detection means for detecting the ringing signals transmitted from the network, originator detection means for detecting the originator identification signal transmitted from the network, and control means, connected to the ringing signal detection means and the originator detection means, for transmitting to at least one of the extension telephones via corresponding ones of the extension lines, originator identification data corresponding to the originator identification signal detected by the originator detection means, the control means including means responsive to ringing signals on and after the (k+1)-th ringing signal for transmitting an incoming call signal to the at least one of the extension telephones via the corresponding ones of the extension line and wherein at least one of the extension telephones includes means for receiving the originator identification data transmitted from the private branch exchange via a corresponding one of the extension lines, and notifying a user of the extension telephone of the received originator identification data, and means responsive to the incoming call signal transmitted from the private branch exchange via the corresponding extension line, for notifying the user of the extension telephone of an incoming call after notification of the received originator identification data is started.

15. The private branch exchange system according to claim 14, wherein the extension telephones start notification of the received originator identification data and notification of the incoming call at the same time.

16. A private branch exchange system connected via at least one subscriber line to a network having a function for transmitting a plurality of ringing signals to the private branch exchange system at regular intervals, with an originator identification signal inserted in an interval between a k-th (k: a predetermined integer) ringing signal and a (k+1)-th ringing signal, comprising:

a private branch exchange connected to the network via the at least one subscriber line; and a plurality of extension telephones including at least one standard telephone with no display function and at least one display-function attached telephone with a display function, the at least one standard telephone and the at least one display-function attached telephone being connected to the private branch exchange via respective extension lines;

wherein the private branch exchange includes:

ringing signal detection means for detecting the ringing signals transmitted from the network, originator detection means for detecting the originator identification signal transmitted from the network, and exchange control means connected to the ringing signal detection means and the originator detection means;

the exchange control means having:

destination determination means for determining whether a destination extension telephone is the at least one standard telephone or the at least one display-function attached telephone, first means operable when the destination extension telephone has been determined to be the at least one display-function attached telephone by the destination determination means, the first means adapted to transmit, to the destination extension telephone, originator identification data corresponding to the originator identification signal detected by the originator detection means, then to cause the destination extension telephone to display the originator identification data, and to transmit an incoming call signal to the destination extension telephone upon or after detection of the (k+1)-th ringing signal by the ringing signal detection means, thereby informing a user of the destination extension telephone of an incoming call, and second means operable when the destination extension telephone has been determined to be the at least one standard extension telephone by the destination determination means, the second means responding to detection of the k-th ringing signal by the ringing signal detection means by transmitting an incoming call signal to the destination extension telephone and thus informing the user of the destination extension telephone of the incoming call.

17. A key telephone system connected via at least one subscriber line to a network having a function for transmitting a plurality of ringing signals to a private branch exchange at regular intervals, with an originator identification signal inserted in an interval between a k-th (k: a predetermined integer) ringing signal and a (k+1)-th ringing signal, comprising:

a key telephone control unit connected to the network via the at least one subscriber line; and a plurality of extension telephones including at least one standard telephone with no display function and at least one key telephone with a display function, the at least one standard telephone and the at least key telephone being connected to the private branch exchange via respective extension lines;

wherein the key telephone control unit includes:

ringing signal detection means for detecting the ringing signals transmitted from the network, originator detection means for detecting the originator identification signal transmitted from the network, and exchange control means connected to the ringing signal detection means and the originator detection means;

the exchange control means having:

destination determination means for determining whether a destination extension telephone is the at least one standard telephone or the at least one key telephone, first means operable when the destination extension telephone has been determined to be the at least one key telephone by the destination determination means, the first means adapted to transmit, to the destination extension telephone, originator identification data corresponding to the originator identification signal detected by the originator detection means, then to cause the destination extension telephone to display the originator identification data, and to transmit an incoming call signal to the destination extension telephone upon or after detection of the (k+1)-th ringing signal by the ringing signal detection means, thereby informing a user of the destination extension telephone of an incoming call, and second means operable when the destination extension telephone has been determined to be the at least one standard telephone by the destination determination means, the second means responding to detection of the k-th ringing signal by the ringing signal detection means by transmitting an incoming call signal to the destination extension telephone and thus informing the user of the destination extension telephone of the incoming call.

* * * * *

UNITED STATES PATENT AND TRADEMARK OFFICE
CERTIFICATE OF CORRECTION

PATENT NO. : 5,963,627
DATED : October 5, 1999
INVENTOR(S) : HIROSHI MANO ET AL.

It is certified that error appears in the above-identified patent and that said Letters Patent is hereby corrected as shown below:

Title page, Item [57], in the Abstract, lines 7-8, after "call", delete "is notified".

Claim 14, col. 18, line 49, "line" should read --lines;--.

Signed and Sealed this

Eighth Day of August, 2000

*Attest:*

Q. TODD DICKINSON

*Attesting Officer*  *Director of Patents and Trademarks*